United States Patent
Shevenell et al.

(10) Patent No.: US 10,057,112 B2
(45) Date of Patent: Aug. 21, 2018

(54) FAULT DETECTION OF SERVICE CHAINS IN A SDN/NFV NETWORK ENVIRONMENT

(71) Applicant: CA, Inc., New York, NY (US)

(72) Inventors: Michael Paul Shevenell, Dover, NH (US); Preetdeep Kumar, Hyderabad (IN); Ravindra Kumar Puli, Hyderabad (IN)

(73) Assignee: CA, INC., New York, NY (US)

( * ) Notice: Subject to any disclaimer, the term of this patent is extended or adjusted under 35 U.S.C. 154(b) by 218 days.

(21) Appl. No.: 15/079,231

(22) Filed: Mar. 24, 2016

(65) Prior Publication Data

US 2017/0279668 A1    Sep. 28, 2017

(51) Int. Cl.
*G06F 15/16* (2006.01)
*H04L 12/24* (2006.01)
*H04L 29/08* (2006.01)

(52) U.S. Cl.
CPC ......... *H04L 41/0677* (2013.01); *H04L 41/12* (2013.01); *H04L 67/10* (2013.01)

(58) Field of Classification Search
CPC .................................................... H04L 9/0866
USPC ........................................................ 709/224
See application file for complete search history.

(56) References Cited

U.S. PATENT DOCUMENTS

| | | | |
|---|---|---|---|
| 9,760,428 B1 * | 9/2017 | Felstaine | G06F 11/0793 |
| 9,967,257 B2 * | 5/2018 | Balmakhtar | H04L 63/10 |
| 2012/0151290 A1 * | 6/2012 | Singh | G05B 23/0278 714/741 |
| 2015/0089331 A1 | 3/2015 | Skerry et al. | |
| 2016/0173338 A1 * | 6/2016 | Wolting | H04L 41/145 709/223 |
| 2016/0203036 A1 * | 7/2016 | Mezic | G06F 11/079 714/819 |
| 2017/0068606 A1 * | 3/2017 | Vora | G06F 11/1407 |
| 2017/0201451 A1 * | 7/2017 | Allan | H04L 45/12 |
| 2017/0257324 A1 * | 9/2017 | Balmakhtar | H04L 43/08 |

(Continued)

OTHER PUBLICATIONS

OpenContrail Blog, "A Tale of Two Layers—Correlating Overlay and Physical Network Data for Better OpenStack Network Analytics", Nov. 3, 2014, http://www.opencontrail.org/overlay-to-physical-network-correlation/; accessed Mar. 24, 2016, 6 pages.

(Continued)

*Primary Examiner* — Hamza N Algibhah
(74) *Attorney, Agent, or Firm* — Sage Patent Group

(57) ABSTRACT

An electronic device includes a processor and a memory coupled to the processor and storing computer readable program code that when executed by the processor causes the processor to perform operations including generating, at given time intervals, a plurality of topology graphs that correspond to a service chain that comprises a plurality of virtual network functions (VNFs) and that is operating in a software defined network (SDN)/network function virtualization (NFV) computing environment, each of the plurality of topology graphs corresponding to a different one of the time intervals. Operations may include comparing a first one of the plurality of topology graphs that is received at a first time to a second one of the plurality of topology graphs that is received at a second time that is after the first time to determine if the service chain has a fault.

20 Claims, 10 Drawing Sheets

(56) References Cited

U.S. PATENT DOCUMENTS

2017/0272437 A1\* 9/2017 Balmakhtar ........ H04L 61/1511
2017/0279668 A1\* 9/2017 Shevenell ........... H04L 41/0677
2018/0019930 A1\* 1/2018 Bruno ................... H04L 41/147

OTHER PUBLICATIONS

Jiang et al., "Fault Management in Service Function Chaining", Internet Working Group, Jul. 6, 2015, 13 pages.

\* cited by examiner

FAULT DETECTION OF SERVICE CHAINS IN A SDN/NFV NETWORK ENVIRONMENT

BACKGROUND

Software-defined networking (SDN) describes computer networking that allows network administrators to manage network services through abstraction of higher-level functionality by decoupling systems that make decisions regarding where network traffic is sent from the underlying systems that forward network traffic to the selected destination. For example, the control plane may reside centrally, while the forwarding components may remain distributed.

Network function virtualization (NFV) is a network architecture concept that uses virtualization technologies to virtualize entire classes of network node functions into building blocks that may be connected, or chained together, to create communication services. An NFV may consist of one or more virtual machines running in different software and processes, on top of standard high-volume servers, switches, storage and/or cloud computing infrastructure, instead of having custom hardware appliances for each network function.

There may be inherent benefits in leveraging SDN concepts to implement and manage and NFV infrastructure, particularly when looking at the management and orchestration of a virtualized network function (VNF). With the rapid growth in popularity and deployment of SDN/NFV in data centers, provisioning network and deploying VNF's has become less time-consuming as well as less costly. In the context of a cloud-based software defined data center (SDDC) cloud providers may delegate creation and management service chains to tenants which suits their needs.

While traditional physical computer networks may include service chains consisting of physical network functions may include ways of detecting service chain faults, such detection may be more difficult if a service chain consists of ordered sets of VNF's. For example, current NFV orchestrator and controller solutions may be unable to detect faults in service chains. In this manner, fault detection of service chains may be delegated to a management layer, which may provide proprietary and specific resolutions.

SUMMARY

Some embodiments of the present inventive concept are directed to methods that include performing operations as follows on a processor of an electronic device. Such operations include receiving a first plurality of metrics values corresponding to a service chain that comprises a plurality of virtual network functions (VNFs) and that is operating in a software defined network (SDN)/network function virtualization (NFV) computing environment at a first time, generating a first time interval specific topology graph that corresponds to the service chain in the SDN/NFV computing environment using the first plurality of metrics values, receiving a second plurality of metrics values corresponding to the service chain that is operating in the SDN/NFV computing environment at a second time that is after the first time, generating a second time interval specific topology graph that corresponds to the service chain in the SDN/NFV computing environment using the second plurality of metrics values, and comparing the first time interval specific topology graph to the second time interval specific topology graph to determine if the service chain has a fault.

Some embodiments further include storing the first time interval specific topology graph in a data repository, responsive to determining that the service chain has a fault, tagging the second time interval specific topology graph as faulty and storing the tagged second time interval specific topology graph, responsive to determining that the service chain does not have a fault and the second time interval specific topology graph is the same as the first time interval specific topology graph, replacing the first time interval specific topology graph with the second time interval specific topology graph in the data repository, and responsive to determining that the service chain does not have a fault and the second time interval specific topology graph is different from the first time interval specific topology graph, storing the second time interval specific topology graph as a new correct topology graph without removing the first time interval specific topology graph from the data repository.

Some embodiments further include generating a plurality of time interval specific topology graphs that include the first and second time interval specific topology graphs and that correspond to a plurality of time intervals, wherein the plurality of metrics values correspond to times defined by the plurality of time intervals and aggregating the plurality of time interval specific topology graphs to provide a playback topology that identifies evolution of the service chain over time.

In some embodiments, generating the first time interval specific topology graph comprises requesting edge set data corresponding to physical network devices, virtual networks, data flow information corresponding to virtual networks, and hosting and identification information corresponding to each of the plurality of VNFs in the service chain.

Some embodiments provide that requesting edge set data corresponding to one of the physical network devices, one or more of the virtual networks, data flow information corresponding to the one or more of the virtual networks, and hosting and identification information corresponding to each of the plurality of VNFs in the service chain comprises sending a simple network management protocol (SNMP) GET request to the one of the physical network devices and receiving a MAC address of the one of the physical network devices, wherein the one of the physical network devices includes a switch or a router, responsive to the SNMP GET request, receiving data corresponding to one or more physical servers that are connected to the one of the physical network devices, receiving, for each of the one or more physical servers, data corresponding to virtual machines that are communicatively coupled to the corresponding one or more physical servers, and receiving, for each of the one or more physical servers, bridge and interface data defined in a respective hypervisor that defines mapping of a physical interface to a logical interface.

In some embodiments, the first time interval specific topology graph and the second time interval specific topology graph each comprise edge set data at multiple network layers that range from the physical network devices to the plurality of VNFs in the service chain at the respective first and second times.

Some embodiments provide that the first plurality of metrics values comprises a first edge set and the second plurality of metrics values comprises a second edge set, and comparing the first plurality of metrics values to the second plurality of metrics values to determine if the service chain has the fault comprises comparing a level 1 topology of the first edge set to a level 1 topology of the second edge set.

Some embodiments provide that the fault is detected if any edge in the level 1 topology of the first edge set is not present in the level 1 topology of the second edge set. In some embodiments, responsive to the level 1 topology of the second edge set including more edge sets than the level 1 topology of the first edge set, the second time interval specific topology graph indicates a positive topology change and the second time interval specific topology graph is stored as a new correct topology graph. In some embodiments, the level 1 topology of the first edge comprises an edge set including the plurality of VNFs in the service chain.

In some embodiments, the service chain comprises an ordered sequence of the plurality of VNFs that guides a packet's flow in the SDN/NFV computing environment.

Some embodiments provide that the service chain comprises a virtual mobile management entity (vMME), a virtual PDN gateway (vPGW), a virtual signaling gateway (vSGW), a virtual firewall, a virtual network address translation (vNAT), a virtual router, a virtual switch, or a virtual intrusion detection system (vIDS).

Some embodiments of the present invention include an electronic device that includes a processor and a memory coupled to the processor and storing computer readable program code that when executed by the processor causes the processor to perform operations described herein. For example, operations may include generating, at given time intervals, a plurality of topology graphs that correspond to a service chain that comprises a plurality of virtual network functions (VNFs) and that is operating in a software defined network (SDN)/network function virtualization (NFV) computing environment, each of the plurality of topology graphs corresponding to a different one of the time intervals and comparing a first one of the plurality of topology graphs that is generated at a first time to a second one of the plurality of topology graphs that is generated at a second time that is after the first time to determine if the service chain has a fault.

Some embodiments include, responsive to determining that the service chain has a fault, tagging the second one of the plurality of topology graphs as faulty and storing the tagged second one of the plurality of topology graphs in a data repository. Some embodiments include, responsive to determining that the service chain does not have a fault and that the second one of the plurality of topology graphs is the same as the first one of the plurality of topology graphs, replacing the first one of the plurality of topology graphs with the second one of the plurality of topology graphs in the data repository. Some embodiments include, responsive to determining that the service chain does not have a fault and that the second one of the plurality of topology graphs is different from the first one of the plurality of topology graphs, storing the second one of the plurality of topology graphs as a new correct topology graph without removing the first one of the plurality of topology graphs from the data repository.

Some embodiments include aggregating the topology graphs to provide a playback topology that identifies evolution of the service chain over time.

In some embodiments, generating the plurality of topology graphs comprises receiving edge set data corresponding to physical network devices, virtual networks, data flow information corresponding to virtual networks, and hosting and identification information corresponding to each of the plurality of VNFs in the service chain.

Some embodiments provide that each of the plurality of topology graphs comprises edge set data at multiple network layers that range from a physical network device to the plurality of VNFs in the service chain.

In some embodiments, the first one of the plurality of topology graphs comprises a first edge set and the second one of the plurality of topology graphs comprises a second edge set, and comparing the first edge set to the second edge set comprises comparing a level 1 topology of the first edge set to a level 1 topology of the second edge set.

Some embodiments provide that the fault is detected if any edge in the level 1 topology of the first edge set is not present in the level 1 topology of the second edge set.

Some embodiments of the present inventive concept are directed to a computer program product that includes a tangible computer readable storage medium comprising computer readable program code embodied in the medium that when executed by a processor of an edge device of a network causes the processor to perform operations described herein. For example, operation may include generating, at given time intervals, a plurality of topology graphs that correspond to a service chain that comprises a plurality of virtual network functions (VNFs), each of the plurality of topology graphs corresponding to a different one of the time intervals, comparing a first one of the plurality of topology graphs that is generated at a first time to a second one of the plurality of topology graphs that is generated at a second time that is after the first time to determine if the service chain has a fault, and responsive to determining that the service chain has a fault, tagging the second one of the plurality of topology graphs as faulty and storing the second one of the plurality of topology graphs in a data repository responsive to the tagging.

Other methods, electronic devices, and computer program products according to embodiments will be or become apparent to one with skill in the art upon review of the following drawings and detailed description. It is intended that all such additional methods, electronic devices, and computer program products be included within this description, be within the scope of the present inventive subject matter, and be protected by the accompanying claims. Moreover, it is intended that all embodiments disclosed herein can be implemented separately or combined in any way and/or combination.

BRIEF DESCRIPTION OF THE DRAWINGS

Other features of embodiments will be more readily understood from the following detailed description of specific embodiments thereof when read in conjunction with the accompanying drawings, in which.

Figure 2:
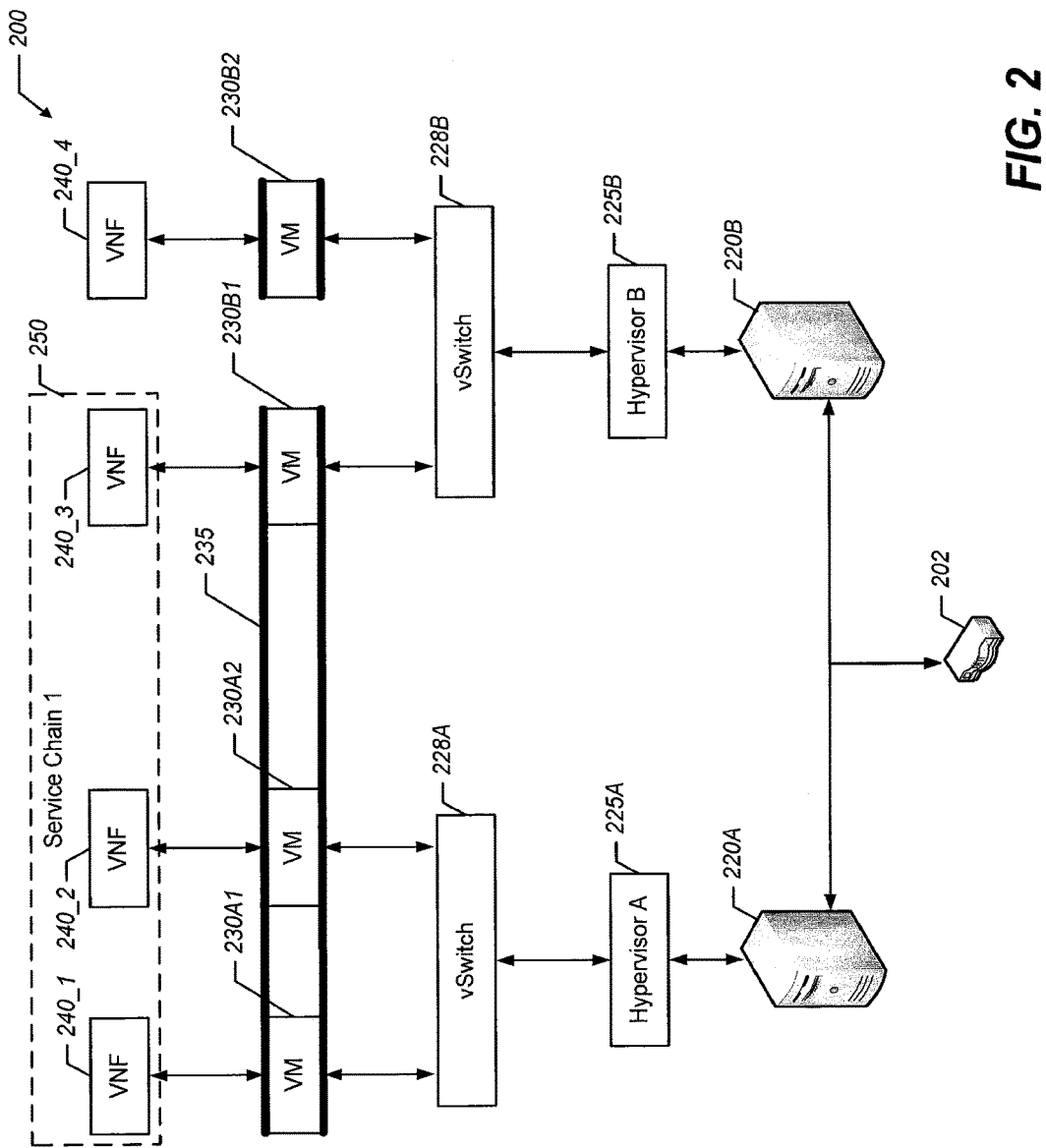
FIG. 2 is a block diagram illustrating a communication network including a SDN/VNF environment that includes an example service chain in accordance with some embodiments of the inventive subject matter.
Figure 3:
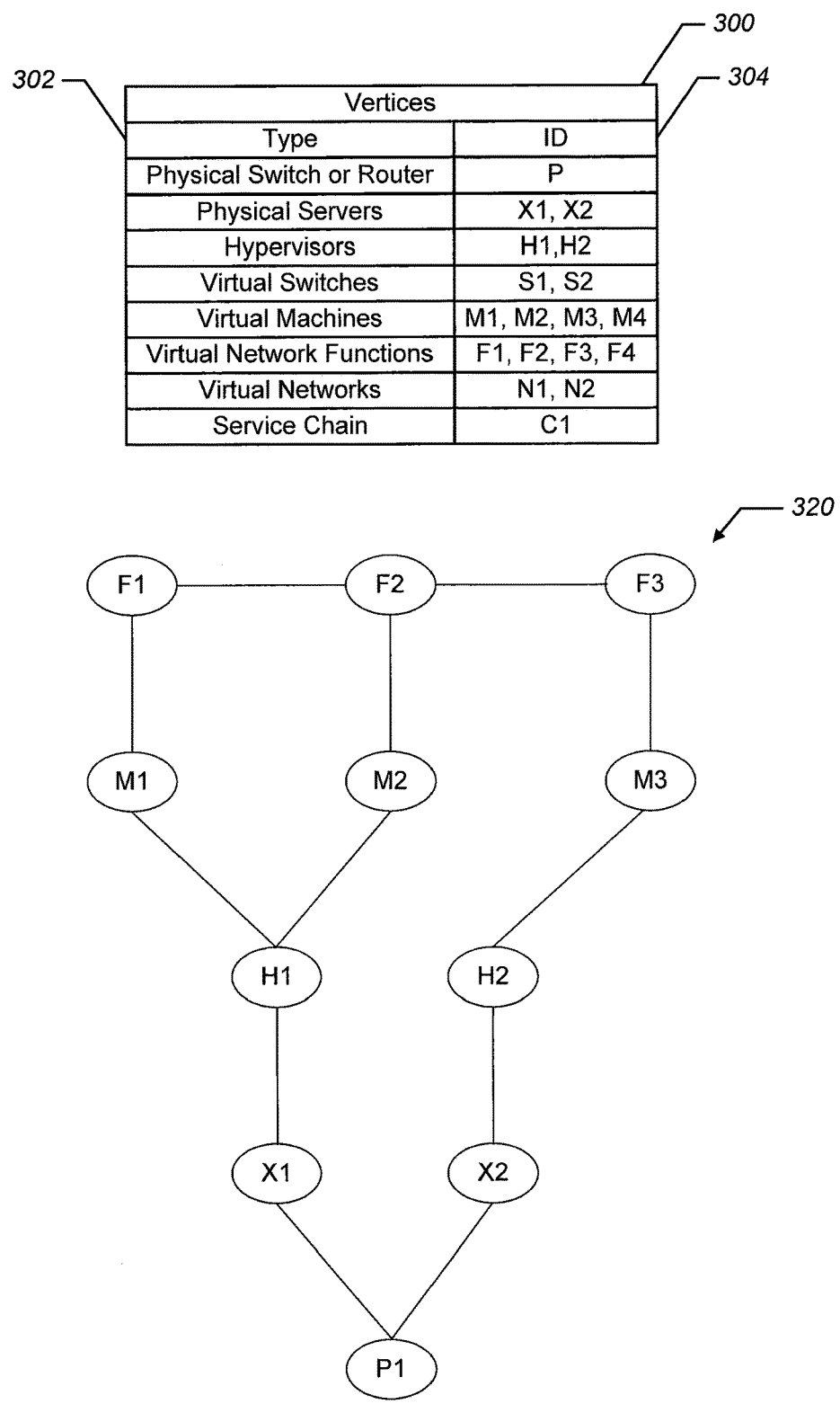
FIG. 3 is a table and a topology graph of topology vertices corresponding to the service chain example illustrated in FIG. 2 in accordance with some embodiments of the inventive subject matter.
Figure 7:
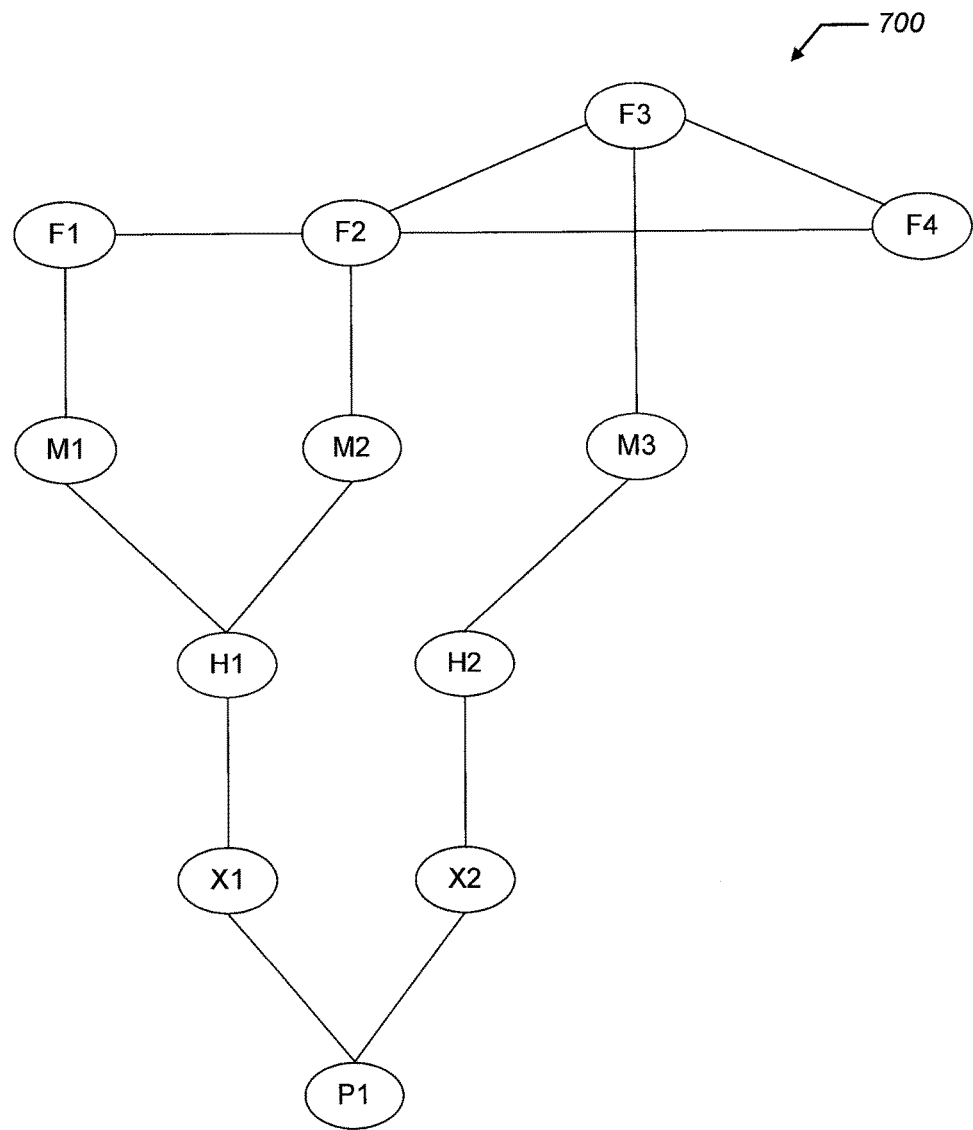
Figure 8:
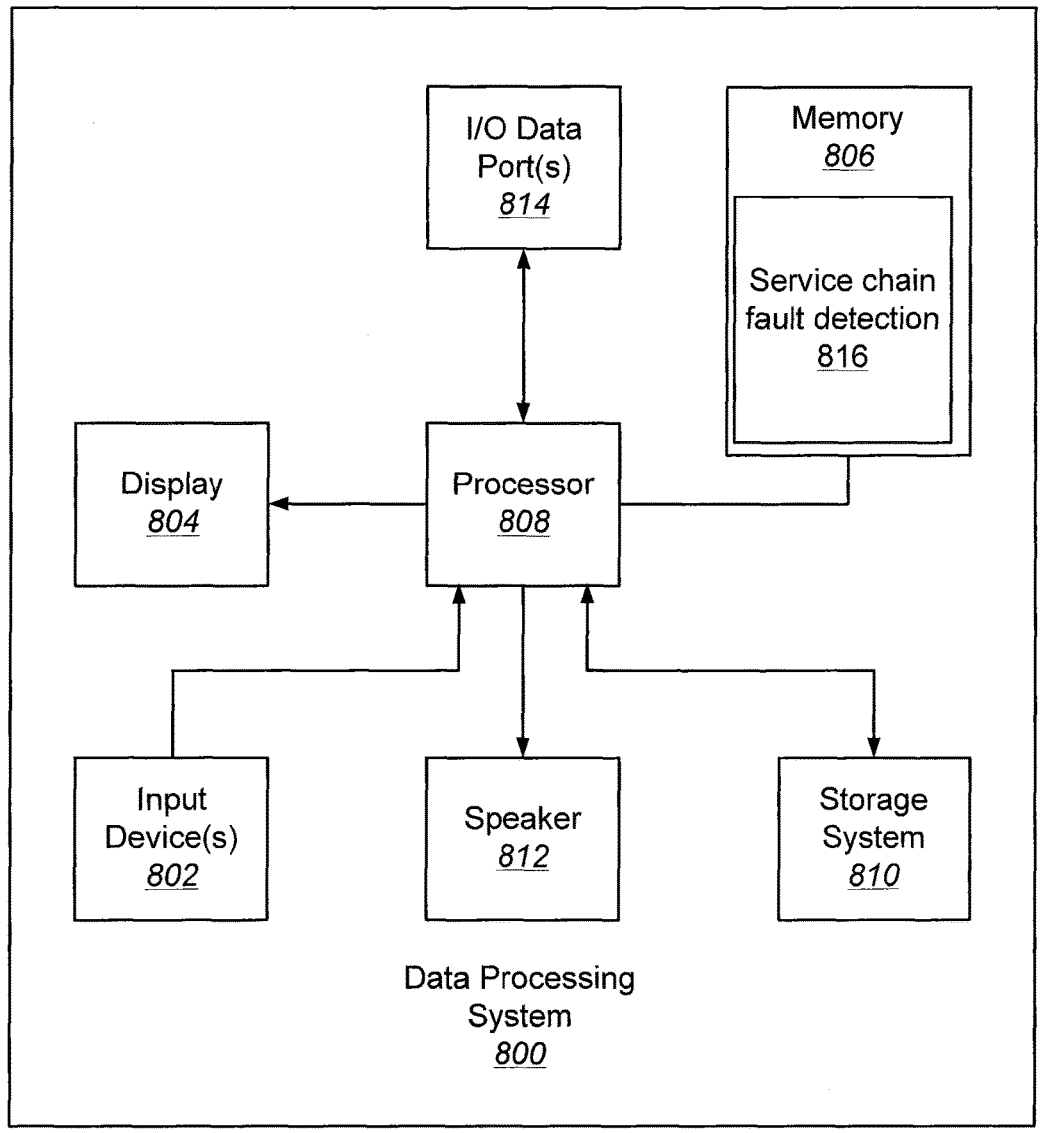
Figure 9:
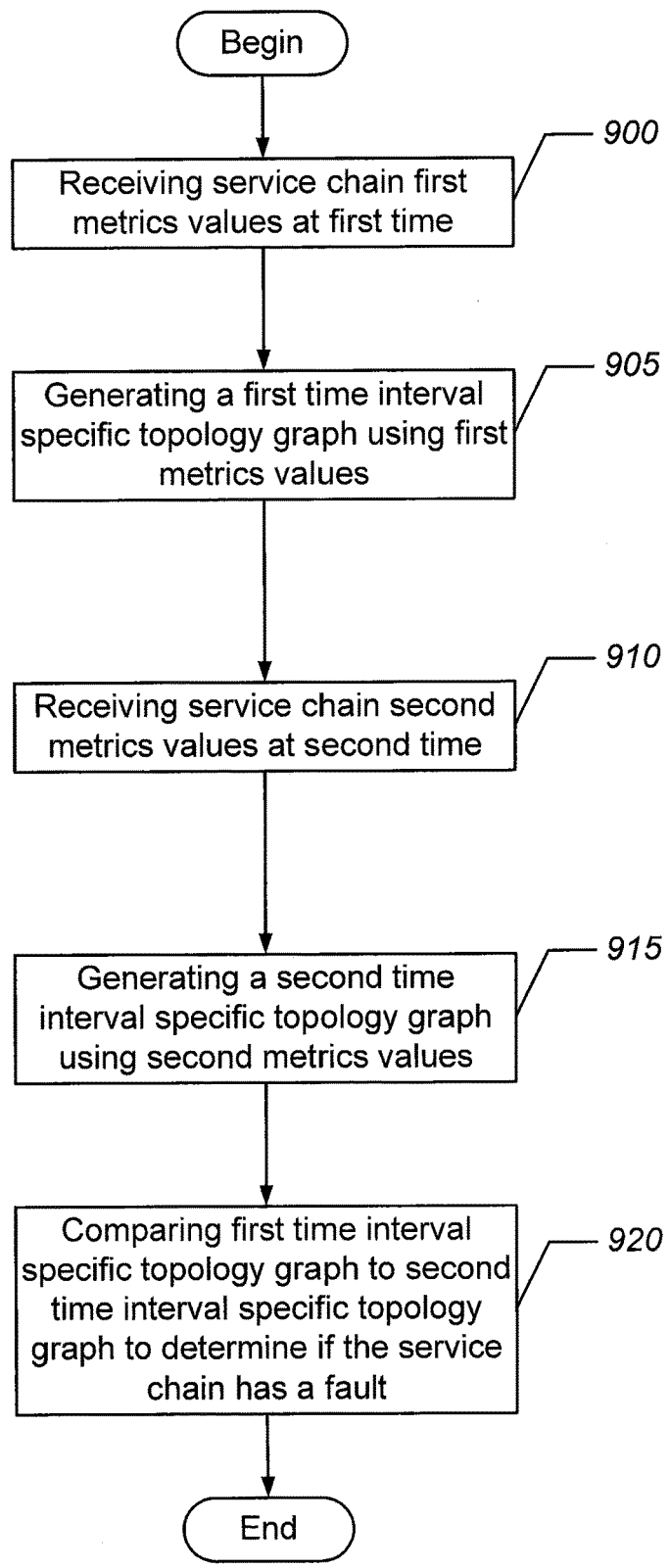
Figure 10:
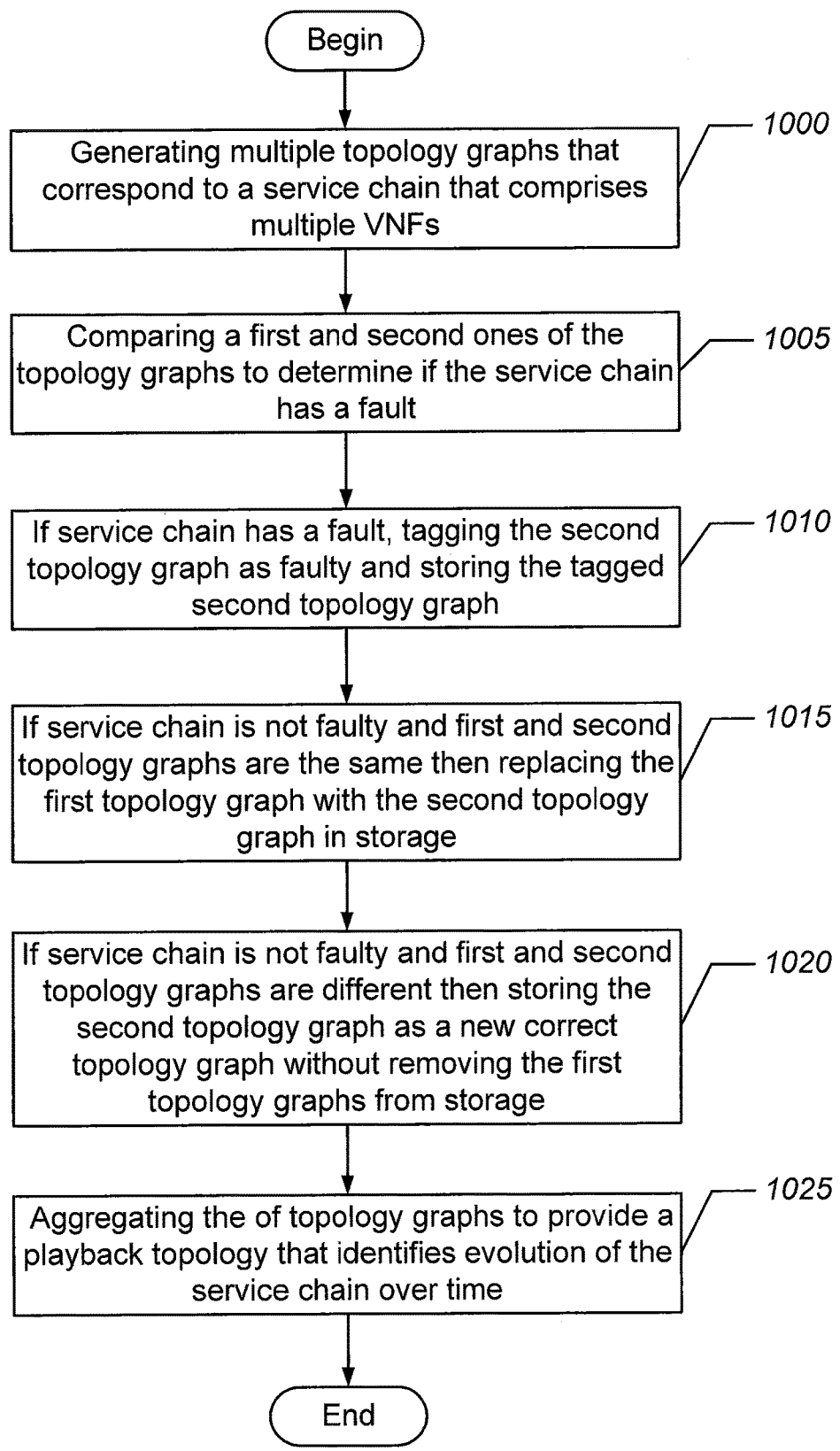

FIG. 7 is a topology graph of topology vertices corresponding to the service chain example illustrated in FIGS. 2 and 3 having a positive change with no fault in accordance with some embodiments of the inventive subject matter;

FIG. 8 is a block diagram illustrating a data processing system for detecting a service chain fault in a SDN/NFV environment in accordance with some embodiments of the inventive subject matter; and FIG. 9 is a block diagram illustrating operations for methods of detecting a service chain fault in a SDN/NFV environment in accordance with some embodiments of the inventive subject matter; and FIG. 10 is a block diagram illustrating operations for methods of detecting detecting a service chain fault in a SDN/NFV environment in accordance with some embodiments of the inventive subject matter.

DETAILED DESCRIPTION

In the following detailed description, numerous specific details are set forth to provide a thorough understanding of embodiments of the present disclosure. However, it will be understood by those skilled in the art that the present invention may be practiced without these specific details. In some instances, well-known methods, procedures, components and circuits have not been described in detail so as not to obscure the present disclosure. It is intended that all embodiments disclosed herein can be implemented separately or combined in any way and/or combination. Aspects described with respect to one embodiment may be incorporated in different embodiments although not specifically described relative thereto. That is, all embodiments and/or features of any embodiments can be combined in any way and/or combination.

As used herein, a "service" includes, but is not limited to, a software and/or hardware service, such as cloud services in which software, platforms, and infrastructure are provided remotely through, for example, the Internet. A service may be provided using Software as a Service (SaaS), Platform as a Service (PaaS), and/or Infrastructure as a Service (IaaS) delivery models. In the SaaS model, customers generally access software residing in the cloud using a thin client, such as a browser, for example. In the PaaS model, the customer typically creates and deploys the software in the cloud sometimes using tools, libraries, and routines provided through the cloud service provider. The cloud service provider may provide the network, servers, storage, and other tools used to host the customer's application(s). In the IaaS model, the cloud service provider provides physical and/or virtual machines along with hypervisor(s). The customer installs operating system images along with application software on the physical and/or virtual infrastructure provided by the cloud service provider.

As used herein, the term "data processing facility" includes, but it not limited to, a hardware element, firmware component, and/or software component. A data processing system may be configured with one or more data processing facilities.

As used herein, data are raw, unorganized facts that need to be processed. Data can be something simple and seemingly random and useless until it is organized. When data are processed, organized, structured or presented in a given context so as to make it useful, it is called content or information. Examples of content or information include, but are not limited to, word processing files, slide presentation program files, spreadsheet files, video files, audio files, picture files, and document exchange files.

As used herein, the term "message" means a unit of information and/or a block of data that may be transmitted electronically as a whole or via segments from one device to another. Accordingly, as used herein, the term "message" may encompass such terms of art as "frame" and/or "packet," which may also be used to refer to a unit of transmission.

Figure 1:
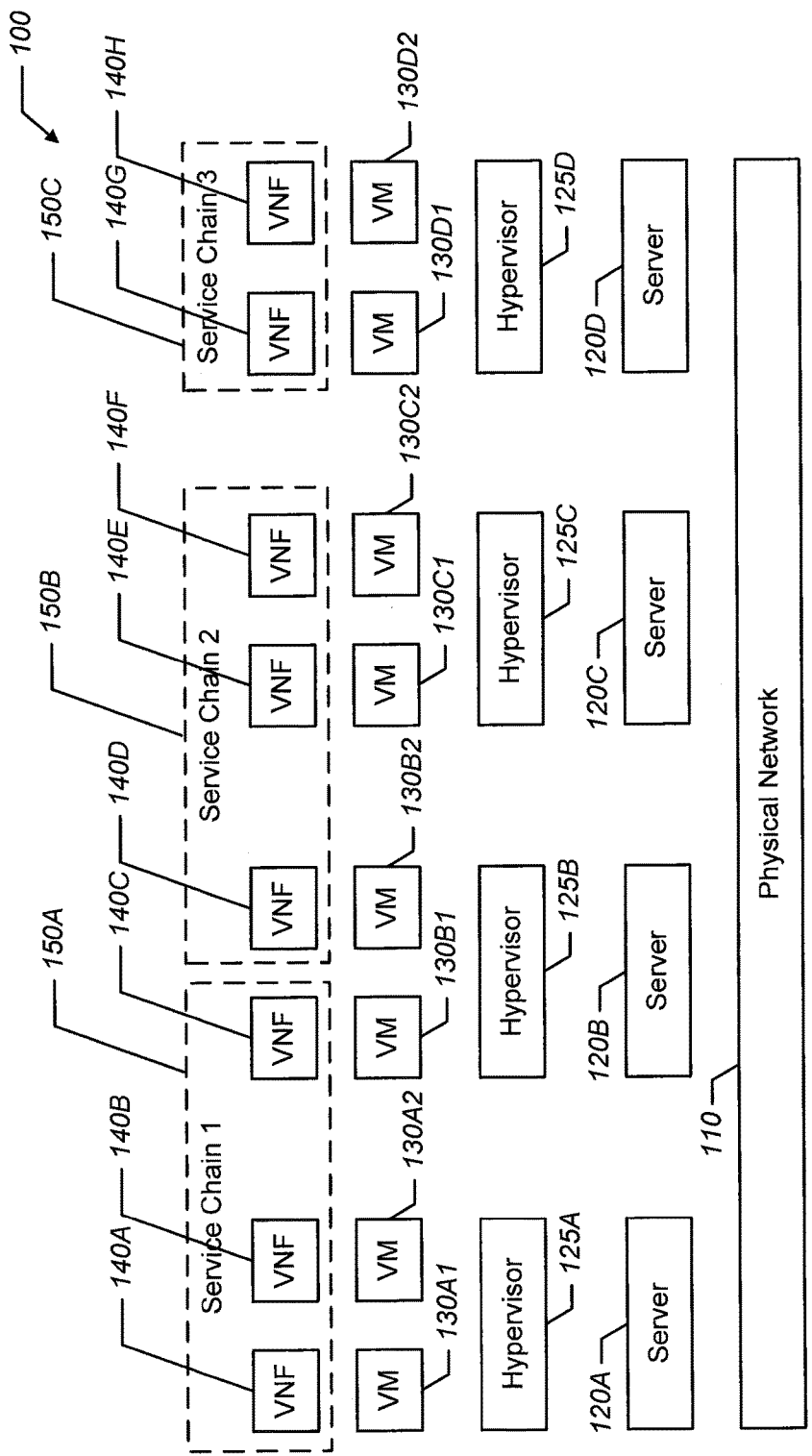
FIG. 1 is a block diagram of a communication network including a SDN/VNF environment for detecting faults in service chains in accordance with some embodiments of the inventive subject matter.

Reference is now made to FIG. 1, which is a block diagram of a computer system including a SDN/VNF environment for detecting faults in service chains in accordance with some embodiments of the inventive subject matter. Some embodiments provide that a service chain fault may refer to any condition which results in the service chain not functioning. For example, defects may occur in the event one or more of the VNFs in the service chain are unavailable, unsupported and/or non-functional. For example, a VNF may be unavailable, unsupported and/or non-functional if one or more of the underlying and/or related network components is not providing the VNF functionality. The computer system 100 may include a physical network 110 that is configured to provide communications and/or processing functionality among multiple different network devices that may be physical devices and/or virtual devices.

The computer system 100 generally hosts and manages one or more virtual machines 130 (hereafter managed virtual machine, or managed machine), each of which may run a guest operating system and an application that provides a virtual network function (VNF) 140. The computing needs of users (e.g., humans and/or other virtual/non-virtual machines) drive the functionality of the virtual machines 130. A virtual hypervisor 125 can provide an interface between the virtual machines 130 and a server 120 that may include a host operating system that allows multiple guest operating systems and associated applications to run concurrently. The host operating system may handle the operations of a physical network 110 capable of implementing virtual machines 130. Although not illustrated herein, one or more data storage spaces may be accessed by the host operating system and may be connected to the physical network 110.

The physical network 110 generally refers to any computer system capable of implementing virtual machines 130, which may include, without limitation, a mainframe computer platform, personal computer, mobile computer (e.g., tablet computer), server, wireless communication terminal (e.g., cellular data terminal), or any other appropriate program code processing hardware. The physical network 110 may include computer resources such as a processing circuit (s) (e.g., central processing unit, CPU); networking controllers; communication controllers; a display unit; a program and data storage device; memory controllers; input devices (such as a keyboard, a mouse, etc.) and output devices such as printers. The processing circuit(s) is configured to execute computer program code from memory device(s), described below as a computer readable storage medium, to perform at least some of the operations and methods described herein, and may be any conventional processor circuit(s), such as the AMD Athlon™ 64, or Intel® Core™ Duo.

The physical network 110 may be further connected to the data storage space through serial and/or parallel connections. The data storage space may be any suitable device capable of storing computer-readable data and program code, and it may include logic in the form of disk drives, random access memory (RAM), or read only memory (ROM), removable media, or any other suitable memory component. According to some embodiments, the host operating system on the server 120 may functionally interconnect the physical network 110 and the users and may be responsible for the management and coordination of activities and the sharing of the computer resources.

A virtual hypervisor 125 (which may also be known as a virtual machine monitor or VMM) may run on the host operating system on the server 120 and may provide an interface between the virtual machine 130 and the physical network 110 hardware platform 114 through the host operating system 112. The virtual hypervisor 125 virtualizes the computer system resources and facilitates the operation of the virtual machines 130. The hypervisor 125 may provide the illusion of operating at the highest priority level to a guest operating system. However, the virtual hypervisor 125 can map the guest operating system's priority level to a priority level lower than the topmost priority level. As a result, the virtual hypervisor 125 can intercept calls from the guest operating system, and execute instructions that require virtualization assistance. Some embodiments provide that the virtual hypervisor 125 may emulate or actually execute the instructions on behalf of the guest operating system. Software steps permitting indirect interaction between the guest operating system and the physical network 110 can also be performed by the virtual hypervisor 125.

As specifically illustrated, the physical network 110 may include and/or be communicatively coupled to one or more servers 120A-120D. Ones of the servers 120A-120D may include and/or be connected to one or more hypervisors 125A-125D, respectively. One or more virtual machines 130A1-130D2 may be identified and/or communicatively coupled to corresponding ones of the one or more hypervisors 125A-125D. For example, virtual machines 130A1 and 130A2 may correspond to hypervisor 125A, virtual machines 130B1 and 130B2 may correspond to hypervisor 125B, virtual machines 130C1 and 130C2 may correspond to hypervisor 125C, and virtual machines 130D1 and 130D2 may correspond to hypervisor 125D. Although each hypervisor 125 is illustrated as corresponding to two virtual machines 130, a hypervisor 125 may be associated with more or less than two virtual machines 130 within the scope and spirit of the present inventive concept.

Each of the virtual machines 130A1-130D2 may provide a virtual network function (VNF) 140A-140H. Ones of the VNFs 140A-140H may provide different functions corresponding to a service that is requested. Examples of VNFs 140 may include virtual packet data network (PDN) gateway (vPGW), virtual signaling gateway (vSGW), virtual firewall, virtual network address translation (vNAT), virtual router, virtual switch, and/or virtual intrusion detection system (vIDS), among others.

In some embodiments, a requested service may be performed by more than one VNF 140. In such embodiments, service chains 150A-C may be defined to provide services that are to be performed by multiple VNFs 140. For example, a service chain 150 may be an ordered sequence of VNF's 140 which guides a packet's flow in a system product (SP) environment. One example includes a packet flow from a public network to a private server farm using multiple VNFs 140 to provide functions corresponding to a virtual router, virtual intrusion detection, and virtual network address translation, among others. Some embodiments provide that the VNFs 140 corresponding to a given service chain 150 may be performed by virtual machines 130 that are on different hypervisors 125 and/or different servers 120. For example, as illustrated, service chain 150A includes VNFs 140A, 140B and 140C. While VNF 140A-140B are provided using the same hypervisor 125A and server 120A, VNF 140C is provided using hypervisor 125B and server 120B.

Reference is now made to FIG. 2, which is a block diagram illustrating an example computer system including a SDN/VNF environment that includes an example service chain in accordance with some embodiments of the inventive subject matter. The illustrated computer system 200 includes several components corresponding to those discussed above regarding FIG. 1. As such, duplicate description thereof may be omitted. The computer system 200 may include a physical switch and/or router 202 and physical servers 220A, 220B, all of which may be components in a physical network. Each of the servers 220A, 220B may support virtual machines (VMs) 230 via respective virtual switches (vSwitches) 228A, 228B. Each of the VMs 230 may provide virtual network functions (VNFs) 240. For example, VM 230A1) may provide VNF 240_1, VM 230A2 may provide VNF 240_2, VM 230B1 may provide VNF 240_3, and VM 230B2 may provide VNF 240_4.

In the present example, a service chain 250 may be defined as an ordered sequence of VNF's 240_1, 240_2, 240_3, which collectively may guide a packet's flow in the system product (SP) environment. As such, by virtue of the service chain 250 the three VMs 230A1, 230A2, 230B1, may be defined as a virtual network 235 corresponding to the service chain 250.

The embodiments for detecting a service chain fault as disclosed herein will not be demonstrated in the context of the present example corresponding to FIG. 2. As disclosed herein, embodiments are directed to detecting a fault in the service chain using an actual topology snapshot to map the fault with respect to the service chain. In some embodiments the topology map may be presented, for example graphically, to a user via a user interface. In some embodiments, an output corresponding to the systems and methods disclosed herein may be used in coordination with a notification system for event generation.

Some embodiments provide that the systems and methods disclosed herein may also be extended to provide application programming interfaces (APIs) that may be used by another entity to perform further root cause analysis. For example, some embodiments provide that the output corresponding to systems and methods disclosed herein, when used with APIs, may be integrated with events and/or alarm systems corresponding to performance management systems thus providing increased levels of automation. In this manner, computation efficiency may be improved.

In generating the topology corresponding to a service chain, a variety of different SDN/NFV components may be considered. For example, the topology may consider a physical switch/router, a physical server that may include one or more network interface cards (NICs), a hypervisor, the multilayer virtual switch that may support distribution across multiple physical servers and/or that encapsulates and/or de-encapsulates traffic from logical to physical networks, virtual machines that may include virtual network interface cards (vNICs), virtual network functions (VNFs), and a service chain (e.g., vFirewall->vLoadBalancer->vNetwork).

As provided herein, an SDN may be viewed as a collection of the virtual entities and virtual network overlay on the physical switches and connectivity. One can define an observable entity within the fault domain which will have the corresponding topology graph that is associated with each observable entity. For example, entities may include the set of physical devices, ingress/egress switches, the set of physical interfaces and the connections within the physical overlay, and the set of VM's, VNFS, OVSs and their connectivity including VTP, OVS bridge interfaces, physical interfaces that are mapped to the OVS interfaces, and VxLANS, among others. The following table include the parameters that may be retrieved corresponding to each of the entities in the SDN.

| Entity | Parameter (Status is common parameter) |
| --- | --- |
| Physical switch/router | MAC address, IP Address |
| Physical server | MAC address, IP Address |
| Hypervisor | VMs hosted, vSwitch (vNIC, Ports, VTEP) |
| vSwitch | Bridge interfaces, Mapping of physical to virtual interface (MAC) |
| VMs | vNICs, IP addresses, Virtual Networks (VxLANs), Parent Hypervisor |
| VNF | ID, Type, Parent VM |
| Service Chain (SC) | Ordered Set of VNFs |

Still continuing with the example computer system 200 illustrated in FIG. 2, reference is now made to FIG. 3, which is a table and a graphical view of topology vertices corresponding to the service chain example illustrated in FIG. 2 in accordance with some embodiments of the inventive subject matter. The table of vertices 300 corresponding to the example service chain 250 include the type 302 and corresponding identifier 304 identify a physical switch/router (P1), physical servers (X1, X2), hypervisors (H1, H2), virtual switches (S1, S2), virtual machines (M1, M2, M3, M4), virtual network functions (F1, F2, F3, F4), virtual networks (N1, N2), and the service chain (C1). Using the entity identifiers, entity edge sets corresponding to the computing system of FIG. 2 are produced below:
a) {{P, X1}, {P, X2},
b) {X1, H1}, {X2, H2},
c) {H1, M1}, {H1, M2}, {H2, M3}, {H2, M4},
d) {X1, S1}, {X2, S2},
e) {S1, M1}, {S1, M2}, {S2, M3}, {S2, M4},
f) {N1, M1}, {N1, M2}, {N2, M3}, {N2, M4},
g) {M1, F1}, {M2, F2}, {M3, F3}, {M4, F4},
h) {F1, F2}, {F2, F1},
i) {C1, F1}, {C1, F2}, {C1, F3},
j) {H1, C1}}
From these edge sets, a topology graph may be constructed at five levels as provided in the following table:

| Levels | Name | Edge set |
| --- | --- | --- |
| 1 | VNFs of Service Chain (C1) | {{F1, F2}, {F2, F3}} |
| 2 | VNFs + VMs | {{F1, F2}, {F2, F3}, {M1, F1}, {M2, F2}, {M3, F3}} |
| 3 | VNFs + VMs + Hypervisors | {{F1, F2}, {F2, F3}, {M1, F1}, {M2, F2}, {M3, F3}, {H1, M1}, {H1, M2}, {H2, M3}} |
| 4 | VNFs + VMs + Hypervisors + Physical Servers | {{F1, F2}, {F2, F3}, {M1, F1}, {M2, F2}, {M3, F3}, {H1, M1}, {H1, M2}, {H2, M3}, {X1, H1}, {X2, H2}} |
| 5 | VNFs + VMs + Hypervisors + Physical Servers + Physical Switch/Router | {{F1, F2}, {F2, F3}, {M1, F1}, {M2, F2}, {M3, F3}, {H1, M1}, {H1, M2}, {H2, M3}, {X1, H1}, {X2, H2}, {P, X1}, {P, X2}} |

Still referring to FIG. 3, using the edge sets corresponding to the levels of topology, a graphical view 320 of the service chain 250 of FIG. 2 is generated. In some embodiments, the vertices and edge sets may be derived based on one or more inputs from a user or input file including an IP address of a physical switch and/or router that may include credentials to send, for example, an SNMP Get request, service chain information including, for example the ordered set of VNFs, and a topology level number.

Some embodiments for detecting a fault in the service chain 250 may include polling the SDN/NFV environment at regular time interval to get metrics to create a topology graph, storing the topology graph with timestamp and provide a unique ID. In some embodiments, the topology graph can be stored in a graph database. The current topology graph may be compared with a previous correct topology graph to identify if there is any fault in the service chain.

Figure 4:
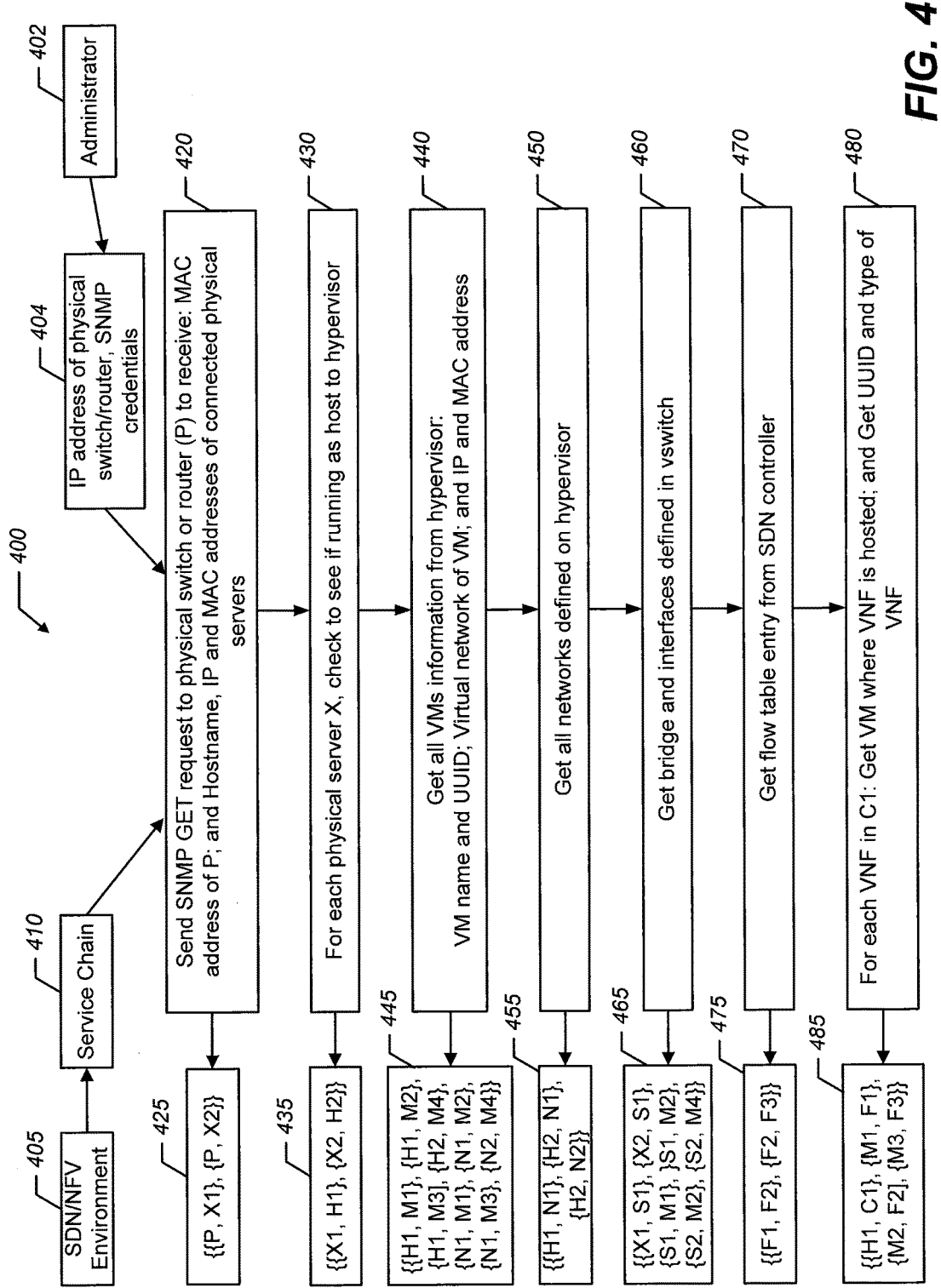
FIG. 4 is a block diagram illustrating operations for generating a topology graph for detecting a service chain fault in a SDN/NFV environment in accordance with some embodiments of the inventive subject matter.

Brief reference is now made to FIG. 4, which is a block diagram illustrating operations for generating a topology graph for detecting a fault in a service chain 410 in a SDN/NFV environment 405 in accordance with some embodiments of the inventive subject matter. In some embodiments, the service chain 410 may be defined based on an input from an administrator, an application and/or by querying the SDN/NFV system. This definition of the service chain may provide the expected level 1 topology for the service chain 410. For example, a defined service chain may provide that an expected level 1 topology for the service chain 410 is C1={{f1, F2}, {F2, F3}} and a VNFNM pair={{M1, F1}, {M2, F2}, {M3, F3}}. An IP address of a physical switch and/or router and NSMP credentials (block 404) may be provided by an administrator 402 or other input data. In some embodiments, metrics for creating the topology graph may be obtained by sending an SNMP GET request to physical switch and/or router P1 to get MAC address of P1 and a hostname, IP and MAC addresses of connected physical servers (X1, X2). (Block 420.) Some embodiments provide that the output sedge set corresponding to this is {{P, X1}, {P, X2}} (block 425).

Some embodiments provide that determinations may be made for each physical server X in (X1, X2). (Block 430.) For example, it may be determined whether the physical server X is running as a host to hypervisor by executing a hypervisor specific CLI/API (E.g. telnet/ssh to server OS, running hypervisor specific commands, or using REST call and parsing the response). Some embodiments provide that the output edge set corresponding to this is {{X1, H1}, {X2, H2}}. (Block 435.) Additionally, information corresponding to all VMs may be retrieved from the hypervisor. (Block 440.) For example, information corresponding to all VMs that may be retrieved may include VM name, VM universally unique identifier (UUID), virtual network of the VM and/or IP address and MAC address. Some embodiments provide that the output may include the edge set {{H1, M1}, {H1, M2}, {H1, M3}, {H2, M4}, {N1, M1}, {N1, M2}, {N1, M3}, {N2, M4}}. (Block 445.)

In some embodiments, all networks defined on the hypervisor may be determined. (Block 450.) Some embodiments provide that the output edge set corresponding to this is {{H1, N1}, {H2, N1}, {H2, N2}}. (Block 455.) Additionally, the bridge and interfaces defined in the vswitch of the corresponding hypervisor may be determined. (Block 460.) For example, one or more protocols and/or API may be used for mapping the physical interface to the logical interface. Some embodiments provide that the output edge set corresponding to this is {{X1, S1}, {X2, S2}, {S1, M1}, {S1, M2}, {S2, M3}, {S2, M4}}. (Block 465.)

The flow table entry from the SDN controller (E.g. vswitch) may be determined. (Block 470.) This will provide packet route between VMs hosting service chains. Some embodiments provide that the output edge set corresponding to the flow table entry may include {{F1, F2}, {F2, F3}}. (Block 475.) Additionally, for each VNF in the service chain [F1, F2, F3], the VM where the VNF is hosted and the UUID and type of the VNF is determined. (Block 480.) Some embodiments provide that the output edge set for the VNF information is {{H1, C1}, {M1, F1}, {M2, F2}, {M3, F3}}. (Block 485.) In this manner, metrics values corresponding to the service chain 250 that includes multiple VNFs 240 may be received. The metrics values received at a first time may be used to establish a base line of service chain performance. For example, a first time interval specific topology graph that corresponds to the service chain may be generated using the metrics values that are received at the first time. In some embodiments, metrics values that are referred to as being "received at" a particular time may be metrics values that are received within a given time interval corresponding to a time that such data was requested.

At a second time that is after the first time, another set of the metrics values corresponding to the service chain may be received and a second time interval specific topology graph that corresponds to the service chain may be generated using the second set of metrics values. According to some embodiments, a fault in the service chain may be detected by comparing the first time interval specific topology graph to the second time interval specific topology graph.

By way of example, two topology graphs G1 corresponding to the first time interval specific topology graph and G2 corresponding to the second time interval specific topology graph may be compared. In the present example, topology graph G1 may have been previously saved and represents the correct service chain environment without a fault and G2 is a currently and/or recently generated topology graph corresponding to the same service chain at a later point in time.

As discussed above, a definition of the service chain may be used to create the expected level 1 topology, which is C1 and, in the current example, is {{F1, F2}, {F2, F3}}. Additionally, the flow table entry may be use to create the actual level 1 topology. In this example, G1 may be considered to be the expected level 1 topology and G2 may be considered to be the actual level 1 topology. In comparing, if the actual level 1 topology does not contain everything in the expected level 1 topology then a fault is detected. Stated differently, each edge set in the expected level 1 topology must be present in the actual level 1 topology for the service chain to be determined to have no fault. As discussed below, additional edge sets in the actual level 1 topology may indicate a positive change relative to the expected level 1 topology as long as all edge sets in the expected level 1 topology are present in the actual level 1 topology.

As provided above, a level 1 topology of the service chain is defined as C1={{F1, F2}, {F2, F3}}. Comparing G1 and G2 may include analyzing the C1 edge sets of each of G1 (expected) and G2 (actual) to verify that the edges of C1 ({F1, F2} and {F2, F3}) are present in G2 (actual). If any of these edges are not present in G2, then a negative change is identified in the service chain and G2 is tagged as faulty. The tagged G2 may be stored with a corresponding timestamp. If all of the C1 edges are present in G2, then the service chain is not faulty, regardless of other differences between G1 and G2.

Additionally, if G2 has more edge sets at any level (G2≠G1) then this is identified as positive change in topology and the new G2 topology may be stored with a corresponding timestamp. Thus, is the actual level 1 topology includes all edge sets of the expected level 1 topology and any additional edge sets, then the service chain definition may be updated to reflect the new expected level 1 topology. For example, a new VM and/or VNF may be added and/or a VM may be moved to different hypervisor. Some embodiments provide that G2 may be identified as a new base topology graph because it represents current state of network. In this manner, subsequently generated topology graphs (e.g., G3, etc.) may be compared to G2 as the current correct service chain environment. Some embodiments provide that the comparison may be limited to only the level 1 topology of each of the expected and actual topologies. Thus, while the topology graphs including all levels corresponding to the expected and actual topologies may be informative, detecting faults in the service chain may rely only on comparison of the level 1 topologies.

Thus, some embodiments provide that if a fault detected in G2 then tag it as faulty before storing, if fault not detected then before storing determine if G2 and G1 are the same. If G1 and G2 are same then simply overwrite G1 with G2. If G1 and G2 are different then G2 becomes the new correct topology which represents current topology. Additionally, G1 may be retained in storage. By retaining multiple time series topology snapshots G1 . . . Gn stored in a graph database, the aggregate of the snapshots G1 . . . Gn may be played back to illustrate the evolution of the service chain in an environment over time.

By way of additional example, based on a new G2 with a new additional edge set {F0, F1}, the expected level 1 topology G1 may be updated with a new edge set and the new C1 may be {{F0, F1}, {F1, F2}, {F2, F3}}. IN such embodiments, the new topology is stored with a time stamp that, when played back will inform an administrator that the service chain C1 was changed at the time corresponding to the timestamp.

Figure 5:
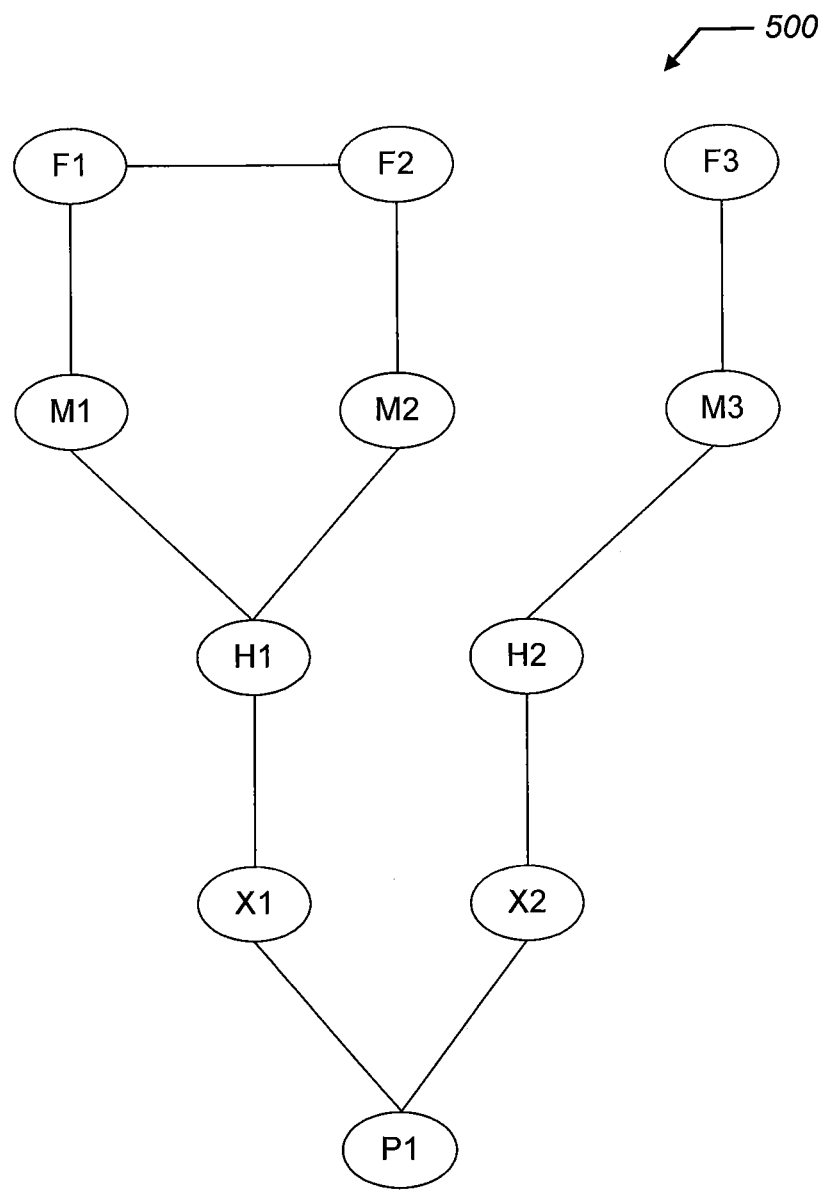
FIG. 5 is a topology graph of topology vertices corresponding to the service chain example illustrated in FIGS. 2 and 3 having a faulty topology in accordance with some embodiments of the inventive subject matter.

Briefly referring back to FIG. 3, the topology graph 320 provides that the level 1 edges of C1 are {F1, F2} and {F2, F3}. In comparison, reference is now made to FIG. 5, which is a topology graph 500 of topology vertices corresponding to the service chain example illustrated in FIGS. 2 and 3 having a faulty topology in accordance with some embodiments of the inventive subject matter. As illustrated in the graphical view 500, the level 1 edges of C1 having the faulty topology are {F1, F2} and are missing the edge {F2, F3}. As such, since the level 1 edges of C1 in the topology graph 500 do not include the edge {F2, F3}, then a negative change is identified in the service chain 250 and the topology graph 500 is tagged as faulty and stored with a corresponding timestamp. Even if other edges in the topology graph 500 are different from those of topology graph 320, the missing level 1 edge corresponding to {F2, F3} renders the service chain 250 as faulty.

Figure 6:
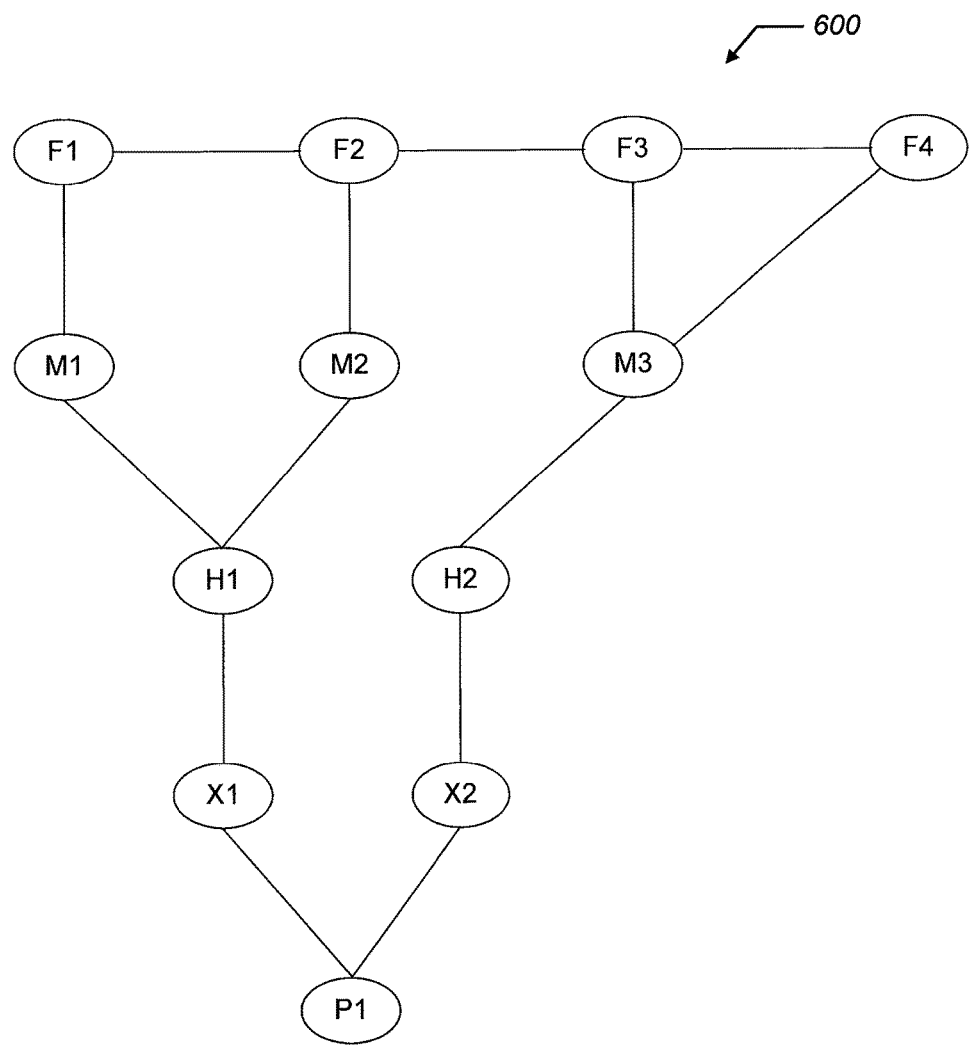
FIG. 6 is a topology graph of topology vertices corresponding to the service chain example illustrated in FIGS. 2 and 3 having a positive change with no fault in accordance with some embodiments of the inventive subject matter.

Additionally, if the level 1 edges of C1 in the topology graph 500 is the same as those of the topology graph 320, other differences would not render the service chain as faulty. For example, brief reference is now made to FIG. 6, which is a topology graph of topology vertices corresponding to the service chain example illustrated in FIGS. 2 and 3 having a positive change with no fault in accordance with some embodiments of the inventive subject matter. In comparing the topology graph 600 to the topology graph 300, each of the level 1 edges of C1 in topology graph 300 ({F1, F2} and {F2, F3}) are present in topology graph 600. As such, a fault is not present in the service chain 250.

Additionally, the level 1 edges of C1 in the topology graph 600 further include edge {F3, F4}. Based on this additional edge, a positive change in the topology graph 600 is identified and the topology graph 600 may be stored with a corresponding timestamp.

Brief reference is now made to FIG. 7, is a topology graph of topology vertices corresponding to the service chain example illustrated in FIGS. 2 and 3 having a positive change with no fault in accordance with some embodiments of the inventive subject matter. In comparing the topology graph 700 to the topology graph 300, each of the level 1 edges of C1 in topology graph 300 ({F1, F2 and {F2, F3}) are present in topology graph 700. As such, a fault is not present in the service chain 250.

Additionally, the level 1 edges of C1 in the topology graph 700 further include edges {F2, F4} and {F3, F4}. Based on these additional edges, a positive change in the topology graph 700 is identified and the topology graph 700 may be stored with a corresponding timestamp.

Reference is now made to FIG. 8, which is a block diagram illustrating a data processing system for detecting a service chain fault in a SDN/NFV environment in accordance with some embodiments of the inventive subject matter. Referring now to FIG. 8, a data processing system 800 that may be used to detect a service chain fault in accordance with some embodiments of the inventive subject matter, comprises input device(s) 802, such as a keyboard or keypad, a display 804, and a memory 806 that communicate with a processor 808. The data processing system 800 may further include a storage system 810, a speaker 812, and an input/output (I/O) data port(s) 814 that also communicate with the processor 808. The storage system 810 may include removable and/or fixed media, such as floppy disks, ZIP drives, hard disks, or the like, as well as virtual storage, such as a RAMDISK. The I/O data port(s) 814 may be used to transfer information between the data processing system 800 and another computer system or a network (e.g., the Internet). These components may be conventional components, such as those used in many conventional computing devices, and their functionality, with respect to conventional operations, is generally known to those skilled in the art. The memory 806 may be configured with a service chain fault detection module 816 that may provide functionality that may include, but is not limited to, detecting service chain faults in a SDN/NFV environment as described herein.

Reference is now made to FIG. 9, which is a block diagram illustrating operations for methods of detecting a service chain fault in a SDN/NFV environment in accordance with some embodiments of the inventive subject matter. Operations include receiving first metrics values corresponding to a service chain that includes multiple VNFs operating in an SDN/NFV computing environment at a first time. (Block 900.) Some embodiments provide that the service chain includes an ordered sequence of the VNFs that guides a packet's flow in the SDN/NFV computing environment. In some embodiments, the service chain includes VNFs for a virtual mobile management entity (vMME), a virtual PDN gateway (vPGW), a virtual signaling gateway (vSGW), a virtual firewall, a virtual network address translation (vNAT), a virtual router, a virtual switch, and/or a virtual intrusion detection system (vIDS).

Operations may include generating a first time interval specific topology graph that corresponds to the service chain in the SDN/NFV computing environment using the first metrics values. (Block 905.) In some embodiments, the first time interval specific topology graph may be generated by requesting edge set data corresponding to physical network devices, virtual networks, data flow information corresponding to virtual networks, and hosting and identification information corresponding to each of the plurality of VNFs in the service chain.

Some embodiments provide that requesting the edge set data includes sending a simple network management protocol (SNMP) GET request to the one of the physical network devices. In some embodiments, a MAC address of the one of the physical network devices may be received responsive to the request. In some embodiments, a physical network device may include a switch or a router. Data corresponding to one or more physical servers that are connected to the physical network devices may be received responsive to the SNMP GET request. Additionally, data corresponding to virtual machines that are communicatively coupled to the physical servers may be received for each physical servers. In some embodiments, bridge and interface data defined in a respective hypervisor that defines mapping of a physical interface to a logical interface may be received for each of the physical servers.

Operations may further include receiving second metrics values corresponding to the service chain that is operating in the SDN/NFV computing environment at a second time that is after the first time. (Block 910.) The second metrics values may be received using similar operations described in reference to the first metrics values, but performed at the second time that is later than the first time.

Additionally, operations may include generating a second time interval specific topology graph that corresponds to the service chain in the SDN/NFV computing environment using the second metrics values. (Block 915.) In some embodiments, the first time interval specific topology graph and the second time interval specific topology graph each comprise edge set data at multiple network layers that range from the physical network devices to the plurality of VNFs in the service chain at the respective first and second times.

Operations may include comparing the first time interval specific topology graph to the second time interval specific topology graph to determine if the service chain has a fault. (Block 920.) In some embodiments, the first metrics values include a first edge set and the second plurality of metrics values comprises a second edge set. In such embodiments, comparing the first plurality of metrics values to the second plurality of metrics values to determine if the service chain has the fault comprises comparing a level 1 topology of the first edge set to a level 1 topology of the second edge set.

In some embodiments, the fault is detected if any edge in the level 1 topology of the first edge set is not present in the level 1 topology of the second edge set. Some embodiments provide that, responsive to the level 1 topology of the second edge set including more edge sets than the level 1 topology of the first edge set, the second time interval specific topology graph indicates a positive topology change and the second time interval specific topology graph is stored as a new correct topology graph.

In some embodiments, the level 1 topology of the first edge is an edge set that includes as element, the VNFs in the service chain.

Some embodiments of the present invention further include storing the first time interval specific topology graph in a data repository. A data repository may include a database that is configured to store multiple ones of and/or instances of the topology graphs that are generated as described herein. For example, each separately stored topology graph and/or instance may correspond to a different time interval over a given time period. As such, when viewed collectively, an evolution of a service chain may be generated for analysis.

In some embodiments, responsive to determining that the service chain has a fault, the second time interval specific topology graph may be tagged as faulty and may be stored.

Some embodiments provide that, responsive to determining that the service chain does not have a fault and that the second time interval specific topology graph is the same as the first time interval specific topology graph, the first time interval specific topology graph may be replaced with the second time interval specific topology graph in the data repository. In this manner, the second time interval specific topology graph becomes the new current topology graph.

Some embodiments provide that, responsive to determining that the service chain does not have a fault and that the second time interval specific topology graph is different from the first time interval specific topology graph, the second time interval specific topology graph may be stored in addition to the first time interval specific topology graph. In such embodiments, the second time interval specific topology graph may be a new correct topology graph without removing the first time interval specific topology graph from the data repository.

Some embodiments further include generating multiple time interval specific topology graphs that include the first and second time interval specific topology graphs and that correspond to multiple time intervals. In such embodiments, the multiple metrics values correspond to times defined by the time intervals. In some embodiments, the multiple time interval specific topology graphs may be aggregated to provide a playback topology that identifies evolution of the service chain over time.

Reference is now made to FIG. 10, which is a block diagram illustrating operations for methods of detecting a service chain fault in a SDN/NFV environment in accordance with some embodiments of the inventive subject matter. Operations may include generating multiple topology graphs that correspond to a service chain that corresponds to multiple VNFs. (Block 1000.) Some embodiments provide that the service chain and VNFs are operating in an SDN/NFV computing environment and that each of the topology graphs correspond to a different time interval.

Some embodiments include comparing a first one of the topology graphs to a second one of the topology graphs to determine if the service chain has a fault. (Block 1005.) In some embodiments, the first topology graph is generated at a first time and the second one of the topology graphs is generated at a second time that is after the first time.

In some embodiments, responsive to determining that the service chain has a fault, tagging the second one of the topology graphs as faulty and storing the tagged second topology graph in a data repository. (Block 1010.) If the service chain does not have a fault and if the second topology graph is the same as the first topology graph, then the first topology graph may be replaced with the second topology graph in the data repository. (Block 1015.) If the service chain does not have a fault and if the second topology graph is different from the first topology graph, then the second topology graph may be stored as a new correct topology graph without removing the first topology graph from the data repository. (Block 1020.)

Some embodiments further include aggregating the multiple topology graphs to provide a playback topology that identifies evolution of the service chain over time. (Block 1025.)

Computer program code for carrying out operations of data processing systems discussed above with respect to FIGS. 1-10 may be written in a high-level programming language, such as Python, Java, C, and/or C++, for development convenience. In addition, computer program code for carrying out operations of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

Moreover, the functionality and structures for service chain fault detection as described herein may each be implemented as a single processor system, a multi-processor system, a multi-core processor system, or even a network of stand-alone computer systems, in accordance with various embodiments of the inventive subject matter. Each of these processor/computer systems may be referred to as a "processor" or "data processing system."

Further Definitions and Embodiments

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method, comprising:
 performing operations as follows on a processor of an electronic device:
 receiving a first plurality of metrics values corresponding to a service chain that comprises a plurality of virtual network functions (VNFs) and that is operating in a software defined network (SDN)/network function virtualization (NFV) computing environment at a first time;

generating a first time interval specific topology graph that corresponds to the service chain in the SDN/NFV computing environment using the first plurality of metrics values;

receiving a second plurality of metrics values corresponding to the service chain that is operating in the SDN/NFV computing environment at a second time that is after the first time;

generating a second time interval specific topology graph that corresponds to the service chain in the SDN/NFV computing environment using the second plurality of metrics values; and comparing the first time interval specific topology graph to the second time interval specific topology graph to determine if the service chain has a fault.

2. The method according to claim 1, further comprising:
storing the first time interval specific topology graph in a data repository;

responsive to determining that the service chain has a fault, tagging the second time interval specific topology graph as faulty and storing the tagged second time interval specific topology graph;

responsive to determining that the service chain does not have a fault and the second time interval specific topology graph is the same as the first time interval specific topology graph, replacing the first time interval specific topology graph with the second time interval specific topology graph in the data repository; and responsive to determining that the service chain does not have a fault and the second time interval specific topology graph is different from the first time interval specific topology graph, storing the second time interval specific topology graph as a new correct topology graph without removing the first time interval specific topology graph from the data repository.

3. The method according to claim 2, further comprising:
generating a plurality of time interval specific topology graphs that include the first and second time interval specific topology graphs and that correspond to a plurality of time intervals, wherein the plurality of metrics values correspond to times defined by the plurality of time intervals; and aggregating the plurality of time interval specific topology graphs to provide a playback topology that identifies evolution of the service chain over time.

4. The method according to claim 1, wherein generating the first time interval specific topology graph comprises requesting edge set data corresponding to physical network devices, virtual networks, data flow information corresponding to virtual networks, and hosting and identification information corresponding to each of the plurality of VNFs in the service chain.

5. The method according to claim 4, wherein requesting edge set data corresponding to one of the physical network devices, one or more of the virtual networks, data flow information corresponding to the one or more of the virtual networks, and hosting and identification information corresponding to each of the plurality of VNFs in the service chain comprises:

sending a simple network management protocol (SNMP) GET request to the one of the physical network devices and receiving a MAC address of the one of the physical network devices, wherein the one of the physical network devices includes a switch or a router;

responsive to the SNMP GET request, receiving data corresponding to one or more physical servers that are connected to the one of the physical network devices;

receiving, for each of the one or more physical servers, data corresponding to virtual machines that are communicatively coupled to the corresponding one or more physical servers; and receiving, for each of the one or more physical servers, bridge and interface data defined in a respective hypervisor that defines mapping of a physical interface to a logical interface.

6. The method according to claim 4, wherein the first time interval specific topology graph and the second time interval specific topology graph each comprise edge set data at multiple network layers that range from the physical network devices to the plurality of VNFs in the service chain at the respective first and second times.

7. The method according to claim 1, wherein the first plurality of metrics values comprises a first edge set and the second plurality of metrics values comprises a second edge set, and wherein comparing the first plurality of metrics values to the second plurality of metrics values to determine if the service chain has the fault comprises comparing a level 1 topology of the first edge set to a level 1 topology of the second edge set.

8. The method according to claim 7, wherein the fault is detected if any edge in the level 1 topology of the first edge set is not present in the level 1 topology of the second edge set.

9. The method according to claim 7, wherein, responsive to the level 1 topology of the second edge set including all edge sets of the level 1 topology of the first edge set and more edge sets than the level 1 topology of the first edge set, the second time interval specific topology graph indicates a positive topology change and the second time interval specific topology graph is stored as a new correct topology graph.

10. The method according to claim 7, wherein the level 1 topology of the first edge comprises an edge set including the plurality of VNFs in the service chain.

11. The method according to claim 1, wherein the service chain comprises an ordered sequence of the plurality of VNFs that guides a packet's flow in the SDN/NFV computing environment.

12. The method according to claim 1, wherein the service chain comprises a virtual mobile management entity (vMME), a virtual PDN gateway (vPGW), a virtual signaling gateway (vSGW), a virtual firewall, a virtual network address translation (vNAT), a virtual router, a virtual switch, or a virtual intrusion detection system (vIDS).

13. An electronic device, comprising:
a processor; and
a memory coupled to the processor and storing computer readable program code that when executed by the processor causes the processor to perform operations comprising:

generating, at given time intervals, a plurality of topology graphs that correspond to a service chain that comprises a plurality of virtual network functions (VNFs) and that is operating in a software defined network (SDN)/network function virtualization (NFV) computing environment, each of the plurality of topology graphs corresponding to a different one of the time intervals;

comparing a first one of the plurality of topology graphs that is generated at a first time to a second one of the plurality of topology graphs that is generated at a second time that is after the first time to determine if the service chain has a fault; and responsive to determining that the service chain has a fault, tagging the second one of the plurality of topology graphs as faulty and storing the tagged second one of the plurality of topology graphs in a data repository.

14. The electronic device according to claim 13, the operations further comprising:

responsive to determining that the service chain does not have a fault and that the second one of the plurality of topology graphs is the same as the first one of the plurality of topology graphs, replacing the first one of the plurality of topology graphs with the second one of the plurality of topology graphs in the data repository; and responsive to determining that the service chain does not have a fault and that the second one of the plurality of topology graphs is different from the first one of the plurality of topology graphs, storing the second one of the plurality of topology graphs as a new correct topology graph without removing the first one of the plurality of topology graphs from the data repository.

15. The electronic device according to claim 14, further comprising aggregating the plurality of topology graphs to provide a playback topology that identifies evolution of the service chain over time.

16. The electronic device according to claim 13, wherein generating the plurality of topology graphs comprises receiving edge set data corresponding to physical network devices, virtual networks, data flow information corresponding to virtual networks, and hosting and identification information corresponding to each of the plurality of VNFs in the service chain.

17. The electronic device according to claim 13, wherein each of the plurality of topology graphs comprises edge set data at multiple network layers that range from a physical network device to the plurality of VNFs in the service chain.

18. The electronic device according to claim 13, wherein the first one of the plurality of topology graphs comprises a first edge set and the second one of the plurality of topology graphs comprises a second edge set, and wherein comparing the first edge set to the second edge set comprises comparing a level 1 topology of the first edge set to a level 1 topology of the second edge set.

19. The electronic device according to claim 18, wherein the fault is detected if any edge in the level 1 topology of the first edge set is not present in the level 1 topology of the second edge set.

20. A computer program product, comprising:

a non-transitory computer readable storage medium comprising computer readable program code embodied in the medium that when executed by a processor of an edge device of a network causes the processor to perform operations comprising:

generating, at given time intervals, a plurality of topology graphs that correspond to a service chain that comprises a plurality of virtual network functions (VNFs), each of the plurality of topology graphs corresponding to a different one of the time intervals;

comparing a first one of the plurality of topology graphs that is generated at a first time to a second one of the plurality of topology graphs that is generated at a second time that is after the first time to determine if the service chain has a fault; and responsive to determining that the service chain has a fault, tagging the second one of the plurality of topology graphs as faulty and storing the second one of the plurality of topology graphs in a data repository responsive to the tagging.

* * * * *